United States Patent
Heeren (10) Patent No.: US 6,339,303 B1
(45) Date of Patent: Jan. 15, 2002

(54) SYSTEM, METHOD, AND PROGRAM PRODUCT FOR CONTROLLING COMMUNICATION OF DISK DRIVE MOTOR

(75) Inventor: Scott Edwin Heeren, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/541,043

(22) Filed: Mar. 31, 2000

(51) Int. Cl.[7] .............................. H02K 23/00
(52) U.S. Cl. ................. 318/254; 318/138; 318/439
(58) Field of Search ............................ 318/254, 138, 318/439

(56) References Cited

U.S. PATENT DOCUMENTS

| | | | | |
|---|---|---|---|---|
| 4,922,169 A | | 5/1990 | Freeman ..................... 318/254 |
| 5,034,668 A | | 7/1991 | Bausch ........................ 318/254 |
| 5,223,771 A | * | 6/1993 | Chari ........................... 318/254 |
| 5,225,759 A | | 7/1993 | Endo et al. .................. 318/778 |
| 5,233,275 A | * | 8/1993 | Danino ........................ 318/254 |
| 5,258,695 A | | 11/1993 | Utenick et al. ............. 318/138 |
| 5,298,838 A | | 3/1994 | Peters et al. ................ 318/138 |
| 5,432,414 A | | 7/1995 | Sakurai et al. ............. 318/254 |
| 5,466,997 A | | 11/1995 | Utenick et al. ............. 318/254 |
| 5,466,999 A | * | 11/1995 | Hutsell ....................... 318/431 |
| 5,530,326 A | * | 6/1996 | Galvin et al. ............... 318/254 |
| 5,808,440 A | * | 9/1998 | Bennett et al. ............. 318/778 |
| 5,821,717 A | * | 10/1998 | Hassan et al. .............. 318/560 |
| 6,091,222 A | * | 7/2000 | Vertemara et al. ......... 318/701 |
| 6,100,656 A | * | 8/2000 | El-Sadi et al. ............. 318/254 |
| 6,218,794 B1 | * | 4/2001 | Shimizu et al. ............ 318/254 |

FOREIGN PATENT DOCUMENTS

| JP | 56046680 A | 4/1981 |
|---|---|---|
| JP | 1234090 A | 9/1989 |
| JP | 2079791 A | 3/1990 |
| JP | 9312996 A | 12/1997 |

* cited by examiner

Primary Examiner—Robert E. Nappi
Assistant Examiner—Rita Leykin
(74) Attorney, Agent, or Firm—Andy Raissinia; Bracewell & Patterson, L.L.P.

(57) ABSTRACT

A system, method, and program product for operating a disk drive motor according to an exponentially decaying commutation curve are disclosed. A disk drive includes a motor, a spindle driven by the motor, one or more rotatable storage media coupled to the spindle, a motor driver circuit coupled to the motor, and a disk drive controller coupled to the motor driver and other disk drive components. The various components of the disk drive are controlled during operation by signals generated by the disk drive system controller. In particular, the disk drive controller can provide commutation timing signals to the motor driver that, in turn, drives the motor. During the first part of motor start-up, the disk drive controller selects external commutation of the motor. Commutation values approximating the first portion of the ideal commutation curve are pre-defined and stored as a look-up table into a memory system. Commutation values approximating the second portion are derived from a linear equation having a slope based on an acceleration characteristic of the motor. If the motor fails to reach the critical BEMF speed, the slope is repeatedly decreased, as necessary, and commutation values are re-calculated for this second portion of the commutation curve until the motor is started. Commutation values generated during both portions of the initial start sequence are used to externally control commutation of the motor. After the motor reaches the critical BEMF speed at which the back-electromotive force is high enough for self-commutation to work properly, internal commutation or self-commutation of the motor is used to commutate the motor.

26 Claims, 4 Drawing Sheets

SYSTEM, METHOD, AND PROGRAM PRODUCT FOR CONTROLLING COMMUNICATION OF DISK DRIVE MOTOR

BACKGROUND OF THE INVENTION

1. Technical Field

The present invention relates in general to motors, and, in particular, to the control of motors for disk drives. Still more particularly, the present invention relates to a system, method, and program product for controlling the commutation timing of a motor, such as a disk drive motor, that has a commutation profile characterized by an exponentially decaying curve.

2. Description of the Related Art

Hard disk drives for data processing systems are driven by motors. The operations of hard disk drives are controlled by a disk drive controller, and the disk drive controller controls a motor driver. The motor driver either externally controls the commutation using an external commutation sequence or internally controls the commutation using self-commutation, which utilizes a back electromotive force detection circuit in the motor driver that receives feedback from the motor windings. When the motor is first starting-up, self-commutation is not available since the motor is not moving fast enough. Therefore, the motor driver must externally control (i.e., via open-loop control) the motor using a commutation sequence provided by a microprocessor of the disk drive controller.

During the initial part of start-up (i.e., before self-commutation is available), the motor driver externally controls the commutation and therefore the speed and acceleration of the motor. The motor driver circuit typically comprises six field-effect transistors (FETs), which are controlled by a "pre-driver" Application Specific Integrated Circuit (ASIC). The pre-driver switches through six commutation states by individually energizing pairs of the six FETs. A commutation period is the duration of time that the commutation driver maintains a particular commutation state before switching to another commutation state.

A motor that is starting up is ideally characterized by a velocity profile that is generally linear. As operational time of the motor elapses, the speed of the motor linearly increases. The speed of the motor in relationship to elapsed operational time is characterized as a linear equation. The commutation period is inversely related to the speed of the motor (i.e., in the form $y=1/x$) and therefore exponentially decreases as motor speed increases. An exponential equation cannot be efficiently implemented by a processor, such as a processor in the disk drive controller or the motor controller.

A polynomial equation has therefore been used by processors to approximate ideal commutation period values over the commutation curve (i.e., the exponentially decaying curve). For example, a fourth order polynomial has been used. The ideal commutation curve can be described as having two portions: the first portion comprises the beginning portion of the curve including the "elbow" of the curve while the second portion is the remainder of the curve following the "elbow". One problem with polynomial approximation is that if coefficients are selected so that the second portion of the ideal commutation curve (i.e., the portion after the "elbow" of the curve) is approximated well, the first portion of the curve (i.e., the portion before and including the "elbow" of the curve) is not approximated well. If the polynomial coefficients are changed to better approximate the first portion of the commutation curve, then the approximation of the second portion of the commutation curve becomes worse. The reason that a polynomial is unable to accurately approximate both the first and second portions of the commutation curve is that the two equations are of different types.

The back-electromotive force (BEMF) detection circuit provides feedback to enable the motor controller to determine when the motor should be commutated (i.e., detects movement of motor rotor's magnetic poles). Some BEMF detection circuits have high BEMF sensitivities that require lower BEMF amplitudes in order to function reliably. Such circuits can employ self-commutation at a lower motor speed (i.e., lower critical BEMF speed). Other BEMF detection circuits have low BEMF sensitivity that require larger BEMF amplitudes to function reliably. In this case, the motor must be accelerated to a higher speed (i.e., higher critical BEMF speed) before self-commutation can be employed. In order for an open-loop start sequence of commutations to drive a motor to reliably reach these higher speeds, the ideal commutation curve must be approximated very closely and accurately.

Additionally, a motor may fail to start and reach the critical BEMF speed on a first start-up attempt. Higher than normal drag may exist for the motor. For example, this higher drag may exist at cold temperatures at which motor grease has a higher viscosity. Higher drag may also happen when a motor has been sitting idle for long periods of time, allowing grease to accumulate rather than remaining distributed evenly around the motor bearings. Adapting the acceleration profile in this higher drag situation is therefore needed in order to start the motor.

Therefore, the present invention recognizes the need for consistently and reliably accelerating a motor from a stopped position to the speed at which self-commutation is able to be used. The present invention also recognizes the need for a commutation period determination that is able to accurately approximate both the first and second portions of the ideal commutation curve in order to control commutation of a motor. The accurate approximation of the commutation curve is especially needed when a BEMF detection circuit having low BEMF sensitivity is used when controlling motor commutation. The present invention further recognizes that the acceleration profile must be adapted for a motor having higher drag.

SUMMARY OF THE INVENTION

A system, method, and program product for operating a disk drive motor according to an exponentially decaying commutation curve are disclosed. A disk drive includes a motor, a spindle driven by the motor, one or more rotatable storage media coupled to the spindle, a motor driver circuit coupled to the motor, and a disk drive controller coupled to the motor driver and other disk drive components. The various components of the disk drive are controlled during operation by signals generated by the disk drive system controller. In particular, the disk drive controller can provide commutation timing signals to the motor driver that, in turn, drives the motor.

During the first part of motor start-up, the disk drive controller selects external commutation of the motor. Commutation values approximating the first portion of the ideal commutation curve are pre-defined and stored as a look-up table into a memory system. Commutation values approximating the second portion are derived from a linear equation having a slope based on an acceleration characteristic of the motor. If the motor fails to reach the critical BEMF speed, the slope is repeatedly decreased, as necessary, and commutation values are recalculated for this second portion of the commutation curve until the motor is started. Commutation values generated during both portions of the initial start sequence are used to externally control commutation of the motor. After the motor reaches the critical BEMF speed at which the back-electromotive force is high enough for self-commutation to work properly, internal commutation or self-commutation of the motor is used to commutate the motor.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
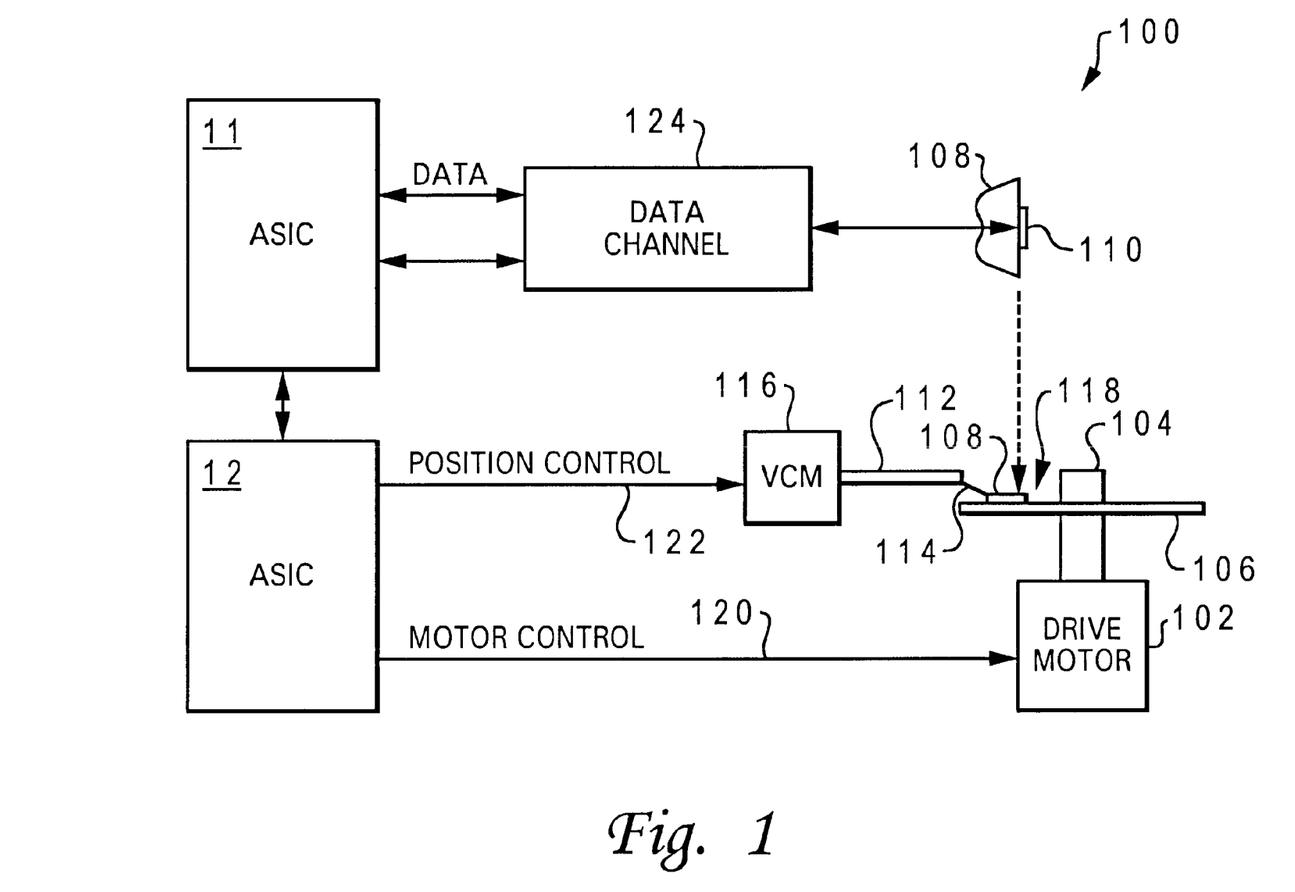
FIG. 1 is a block diagram of a hard disk drive driven by a motor that is controlled in accordance with the present invention.

With reference now to FIG. 1, disk drive or data storage system 100 includes a housing (not illustrated) containing at least one rotatable magnetic disk 106 supported on a spindle 104 and rotated by a drive motor 102. Each magnetic disk 106 has a magnetic recording medium formed on at least one disk surface 118, where the magnetic recording medium is arranged in an annular pattern of concentric data tracks (not shown). At least one slider 108 including one or more magnetic read/write heads 110 is positioned over magnetic disk 106. Slider 108 is suspended from an actuator arm 112 by a suspension 114 (also referred to as a head gimbal assembly (HGA)). The radial position of slider 108 with respect to the tracks of magnetic disk 106 is controlled by voice coil motor (VCM) 116.

During operation of disk drive 100, the rotation of magnetic disk 106 generates an air bearing between slider 108 and disk surface 118. The air bearing thus counterbalances the slight downward-biased spring force of suspension 114 and supports slider 108 above disk surface 118 by a small, substantially constant spacing. As magnetic disk 106 is rotated by drive motor 102, slider 108 is moved radially in and out in response to the movement of actuator arm 112 by VCM 116, thus permitting magnetic read/write head 110 to read or write data of interest in different tracks. Read and write signals are communicated to and from read/write head 110 via data channel 124, which includes conductor lines running along suspension 114 and actuator arm 112. Data read from or to be written to magnetic disk 106 via data channel 124 is buffered by a memory system within Application Specific Integrated Circuit (ASIC) 11.

Figure 4:
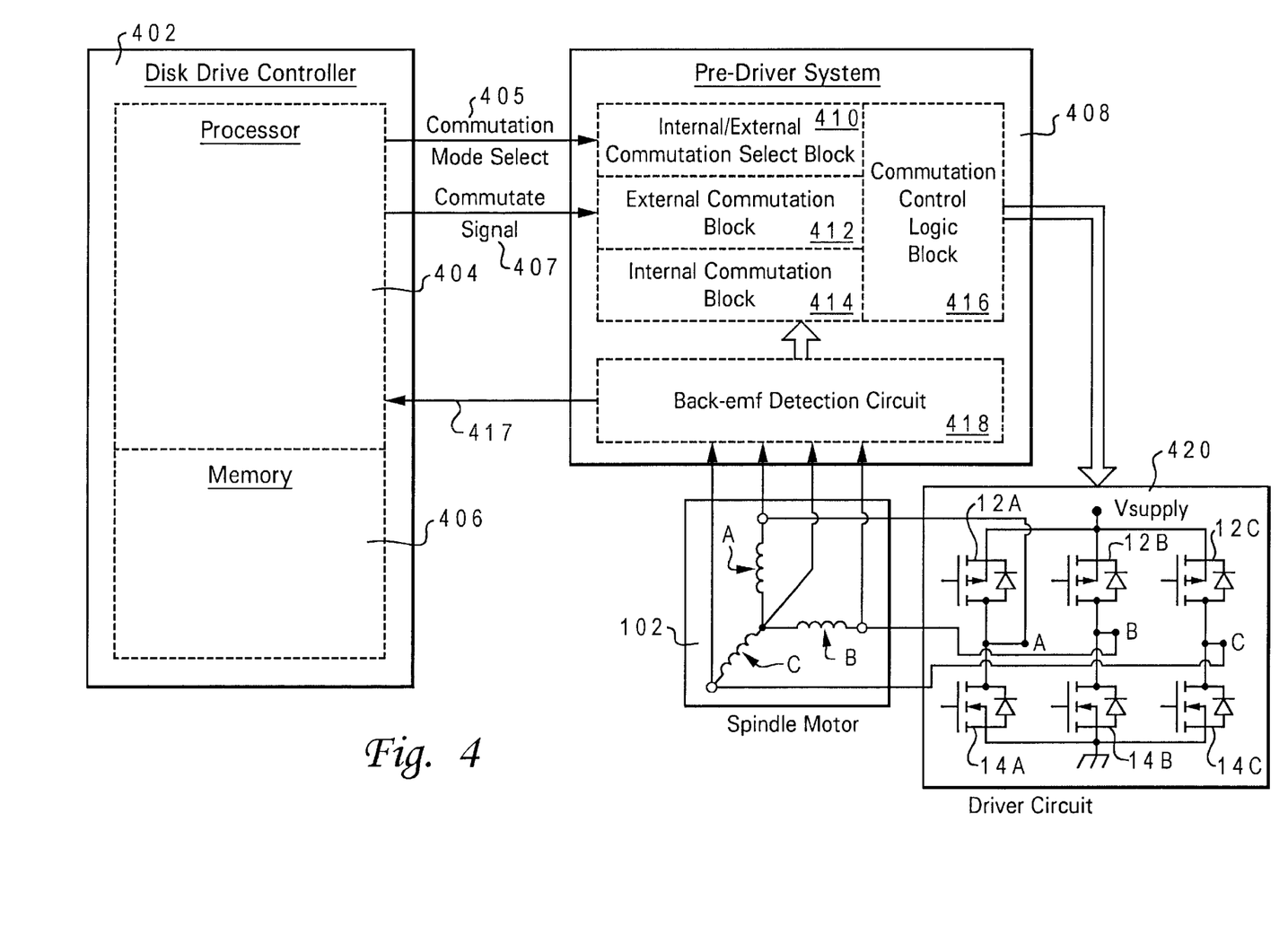
FIG. 4 is an exemplary block diagram of the disk drive controller and motor controller for controlling the motor of the hard disk drive of FIG. 1 in accordance with the present invention.

The various components of disk drive 100 are controlled during operation by signals generated by ASIC 11, which contains a disk drive system controller, such as a disk drive controller 402 shown in FIG. 4. Another ASIC 12 is coupled to and in communication with ASIC 11. ASIC 12 comprises a motor controller or motor driver that controls overall operation of motor 102 for disk drive 100. The motor controller or motor driver comprises a pre-driver system 408 and a driver circuit 420 as shown in FIG. 4. The control signals generated by ASIC 12 include motor control signals 120, which control the rotation of spindle 104 by drive motor 102, and head position control signals 122, which provide the desired current profiles to optimally move and position a selected slider 108 to a desired data track on the associated magnetic disk 106. Thus, a disk drive controller is made part of ASIC 11 while a motor controller having a predriver system and driver circuit are made part of ASIC 12 to drive and operate motor 102 in accordance with the present invention. The disk drive controller and motor controller with pre-driver system and driver circuit will be discussed later in more detail with reference to FIG. 4.

Figure 2:
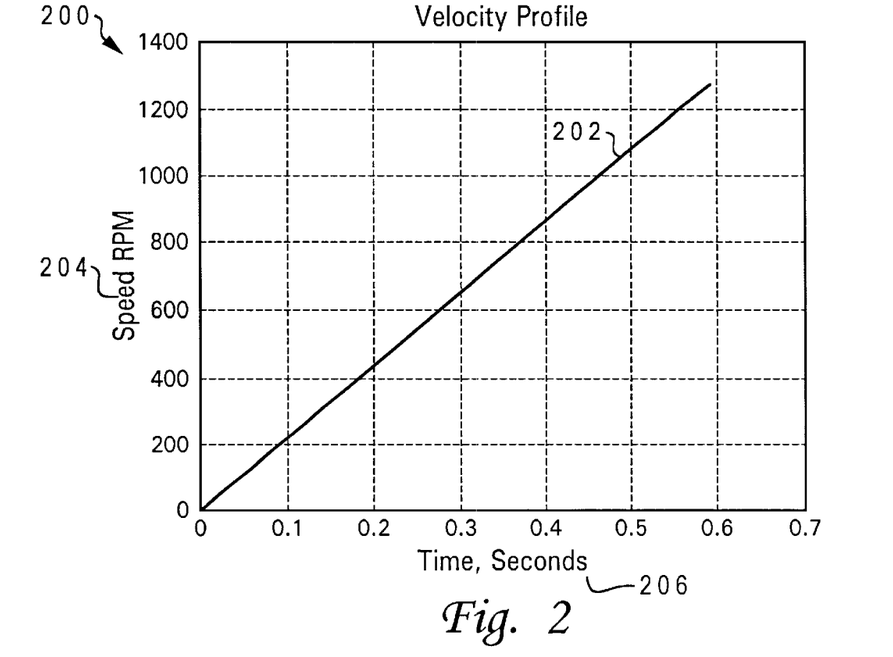
FIG. 2 is a graph of the acceleration profile for the motor in FIG. 1.

Referring to FIG. 2, a graph 200 of a velocity profile for motor 102 during a start-up period is shown. Graph 200 shows speed 204 of motor 102 in revolutions per minute (RPMs) plotted against elapsed time 206 in seconds, which yields a linear velocity profile 202 having a positive slope. The acceleration of motor 102 is given by the slope of velocity profile 202. Thus, for motor 102 of FIG. 2, which has a velocity profile slope 2200 RPM per second, the speed of motor 102 can be calculated by:

Speed=(2200 RPM/Sec)*time

Figure 3:
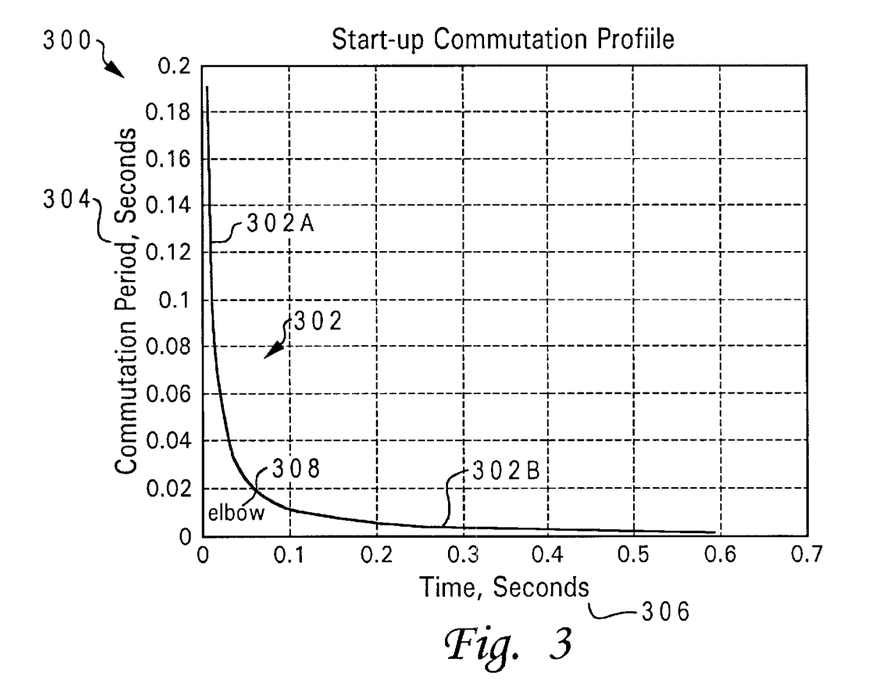
FIG. 3 is a graph of the commutation profile for the motor in FIG. 1.

The commutation period is inversely related to motor speed. With reference to FIG. 3, a graph 300 of the commutation profile for motor 102 during the start-up period is shown. Graph 300 shows commutation period 304 in seconds plotted against elapsed time 306 from the time motor 102 starts (i.e., time 0) in seconds. The commutation profile of motor 102 is shown to be an exponentially decaying curve 302. Curve 302 has an "elbow" portion 308, a first portion 302A before elbow portion 308, and a second portion 302B after elbow portion 308. The present invention externally controls the commutation of motor 102 during the start-up period to accurately or closely model exponentially decaying curve 302. After motor 102 reaches a critical speed at which back-electromotive force ("BEMF") is large enough for self-commutation, commutation is internally controlled by the self-commutation of the motor for the remainder of the motor acceleration to the target operational velocity and thereafter.

Referring to FIG. 4, an exemplary block diagram of disk drive controller 402 and motor controller or driver having pre-driver system 408 and driver circuit 420 for controlling motor 102 in accordance with the present invention is shown. Disk drive controller 402 drives predriver system 408 of the motor controller. Pre-driver system 408, in turn, drives driver circuit 420. Driver circuit 420 is coupled to motor 102, which has three phase windings A, B, and C. Driver circuit 420 delivers current to motor 102 during all commutation states. Driver circuit 420 comprises six field effect transistors (FETs) 12A, 14A, 12B, 14B, 12C, and 14C. FETs 12A and 14A are coupled to winding A, while FETs 12B and 14B are coupled to winding B and FETs 12C and 14C are coupled to winding C. For proper operation, driver circuit 420 is coupled to power supply voltage $V_{Supply}$ and to ground. During any commutation state, driver circuit 420 supplies current to motor 102 as follows: Current flows from the power supply $V_{Supply}$, through an upper FET (i.e., either upper FET 12A, 12B, or 12C), and into the motor terminal attached to this upper FET. The current flows through two of the three motor windings (depending upon which upper/lower combination is utilized) and out the motor terminal attached to the single lower FET which is turned-on. Finally, the current flows through the lower FET to ground. Signals from windings A, B, and C of motor 102 are fed back to a back electromotive force (BEMF) detection circuit 418 in pre-driver system 408.

Disk drive controller 402 comprises processor 404 and memory system 406 coupled to and in communication with each other. Pre-driver system 408, in addition to having BEMF detection circuit 418, also comprises a series of logic circuits that include an internal/external commutation select circuit 410, an external commutation circuit 412, an internal commutation circuit 414, and a commutation control logic circuit 416 for controlling commutation of motor 102 in accordance with the present invention. Commutation control logic circuit 416 determines the commutation state of motor 102. Processor 404 of disk drive controller 402 selects between an internal and external commutation mode by issuing a commutation mode select signal 405 to internal/external commutation select circuit 410. If the external commutation mode is selected by signal 405, processor 404 must issue a pulse via commutate signal 407 to external commutation circuit 412 of pre-driver system 408 in order to commutate motor 102. If internal commutation mode, on the other hand, is selected by a signal 405 from processor 404, then motor commutation is handled by internal commutation block 414 independent of processor 404. Commutation control logic circuit 416 receives the processed data from logical circuits 410, 412, and 414 and controls driver circuit 420 to drive the commutation of motor 102 based on signals, such as signals 405 and 407, received by pre-driver system 408 from disk drive controller 402. BEMF detection circuit 418 provides feedback in the conventional way to enable pre-driver system 408 to determine when motor 102 should be commutated (i.e., detects movement of rotor's magnetic poles relative to phase windings A, B, and C which affects how commutation timing is to be controlled).

During the "external commutation mode", commutate signal 407 determines when motor 102 should be commutated by pre-driver system 408, which, in turn, drives driver circuit 420. Commutation values for first portion 302A of commutation curve 302 are pre-defined and stored as a look-up table into memory system 406. Processor 404 retrieves the commutation values from the look-up table in memory system 406. The linear equation for calculating commutation values for second portion 302B of commutation curve 302 and the elapsed times for the linear equation are also stored into memory system 406. Processor 404 executes the calculations for determining the commutation values for second portion 302B as well. To implement the commutation values, processor 404 pulses commutate signal 407 each time a new commutation is to occur. Commutate signal 407 is received by external commutation logical circuit 412 and carried out by commutation control logic block 416.

Figure 5:
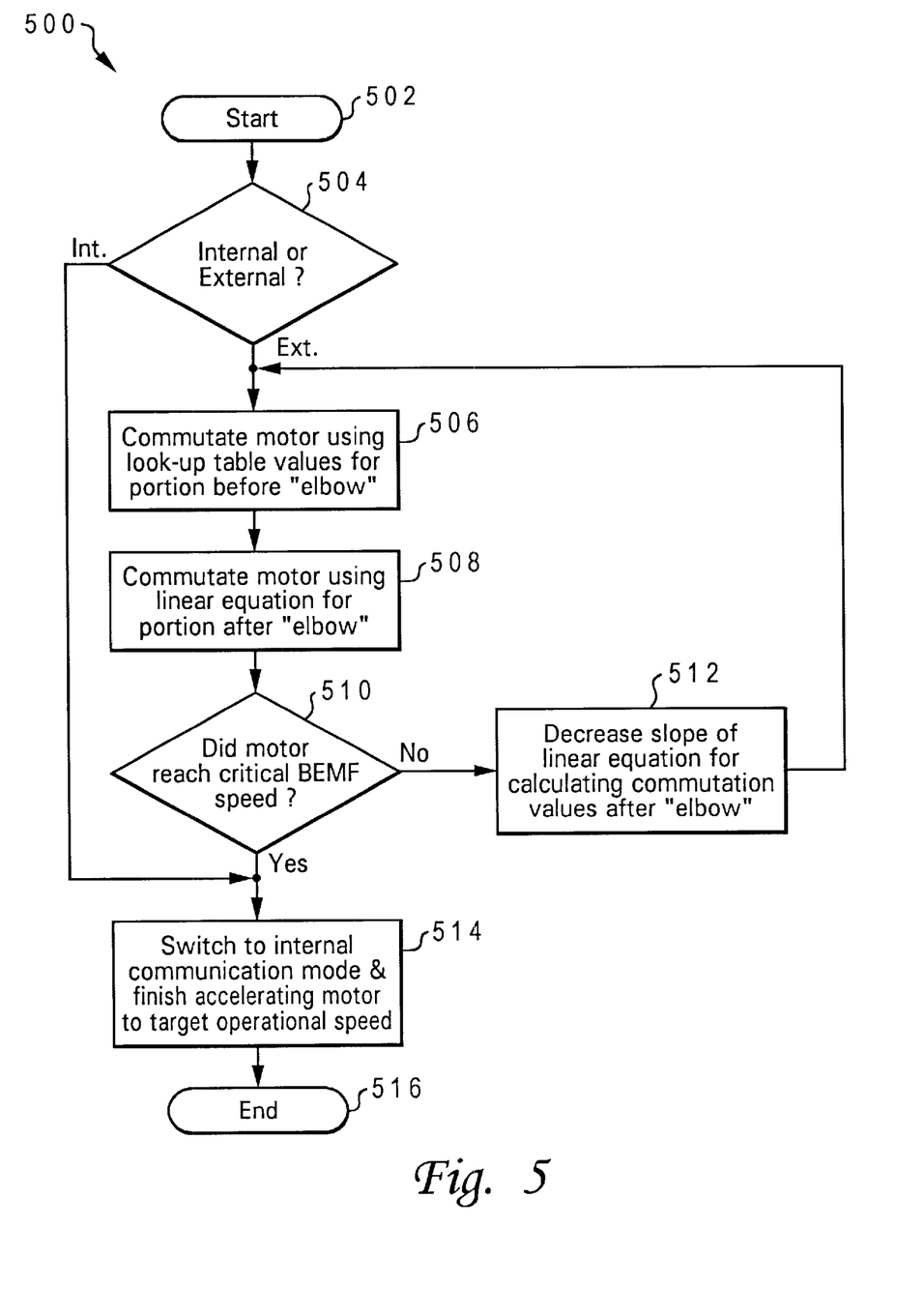
FIG. 5 is a flow chart of a method for operating a disk drive motor in accordance with the present invention.

With reference now to FIG. 5, a flow chart of a method 500 for operating and controlling commutation of a motor 102 for driving a disk drive 100 in accordance with the present invention is shown. Method 500 starts at block 502 and moves to decision block 504, which depicts processor 404 selecting between an external commutation mode or an internal commutation mode. If motor 102 has already been started-up and has reached the critical BEMF speed, then processor 404 selects an internal commutation mode or self-commutation mode to drive motor 102 via BEMF detection circuit 418, internal commutation block 414, and commutation control logic block 416. Following an internal commutation mode selection at decision block 504, method 500 proceeds directly to block 514, which shows that pre-driver system 408 directs the self-commutation mode for commutating the motor throughout the remainder of the start-up of motor 102 until motor 102 finishes accelerating to a target operational speed, and method 500 then ends at block 516.

On the other hand, if motor 102 has not yet been started-up or has not yet reached the critical BEMF speed, then processor 404 selects external commutation mode to drive motor 102. External mode control select signal 405 is sent to internal/external commutation select circuit 410 of pre-driver system 408. Following an external commutation mode selection at decision block 504, block 506 shows that motor 102 is commutated by utilizing the first commutation values pre-defined for first portion 302A of commutation curve 302 and stored in memory system 406 (i.e., stored in the look-up table). Commutation values for first portion 302A of commutation profile 302 are derived from an equation based on velocity profile 202 of motor 102. The general equation for computing first commutation control values for first portion 302A is as follows:

$$\text{Comm Period for FP} = 1/V(t) = 1/(\text{slope} \ast t)$$

in which Comm Period for FP is the value of the commutation period for the motor during first portion 302A of curve 302 at a particular elapsed time t from when motor 102 started, V(t) is the velocity at time t, and slope is an acceleration based on the ideal start-up velocity profile of the motor.

For exemplary motor 102, the specific equation is Comm Period for FP=1/(((2200 RPM/sec)*time)*(24/60)) since 2200 RPM/sec is the start-up acceleration for motor 102 and 24/60 is a conversion factor from units of revolutions/minute to commutation intervals/second. Only a certain number of commutation values, such as five or six values, need to be pre-defined for modeling first portion 302A of commutation profile curve 302. Each of the particular commutation values is sequentially derived on the basis of when a total of the pre-defined commutation values, including the commutation value to be determined, equals the elapsed time. For example, if T1 is the first commutation period and t1 is a first total amount of elapsed time from when motor 102 has started, then T1 is determined when T1 equals t1. Referring back to FIG. 3, T1 equals t1 at about 0.035 seconds. Furthermore, if T2 is the second commutation period and t2 is a second total amount of elapsed time from when motor 102 started, then T2 is determined when the sum of T1 and T2 equals t2. Subsequent pre-defined commutation values are derived for following elapsed times in the same manner.

Referring back to FIG. 5, method 500 moves from block 506 to block 508, which depicts that motor 102 is commutated by utilizing commutation values derived for second portion 302B of commutation curve 302. The general linear equation for computing commutation control values for second portion 302B is as follows:

$$\text{Comm Period for SP} = (\text{slope} \ast \text{SP time}) + (\text{last Comm Period for FP})$$

in which Comm Period for SP is the value of a commutation period for the motor during second portion 302B of curve 302 at a particular elapsed time starting from the last commutation period for first portion 302A, slope is the linear rate of decrease of commutation periods (a negative value) as shown in second portion 302B of commutation curve 302, and SP time is the amount of time that has elapsed for second portion 302B starting from the last commutation period of first portion 302A.

Various commutation periods for second portion 302B are computed for respective elapsed times (i.e., SP times) and stored in memory system 406. Alternatively, values may be calculated one at a time, as needed, and then immediately used and applied as the values are computed. The calculated commutation periods are then used by processor 404 and pre-driver system 408 to drive driver circuit 420 and control commutation of motor 102 to model second portion 302B of commutation profile 302 for motor 102.

Method 500 next moves to decision block 510, which shows processor 404 determining whether motor 102 has reached a critical BEMF speed. Windings A, B, and C are located in a stator of motor 102. A rotor revolves around an outside portion of the stator. The rotor houses magnetic poles, and, as these poles move around windings A, B, and C, the poles generate a moving electromagnetic field. The resulting effect on windings A, B, and C is a moving (sinusoidal) voltage waveform (i.e., BEMF voltage). The magnitude of this voltage is directly proportional to motor speed. BEMF detection circuit 418 only operates properly when this BEMF voltage is above a critical threshold level (i.e., motor 102 is rotating above a corresponding critical BEMF speed). As stated earlier, motor 102 may not have started and reached the critical BEMF speed due to drag conditions (i.e., due to cold temperature conditions or accumulated grease) that have not been factored into the equation for the commutation values for first portion 302A.

If motor 102 has not reached the critical BEMF speed, method 500 proceeds to block 512, which shows that processor 404 decreases the slope (i.e., acceleration) of motor 102 in the equation used to derive commutation values for second portion 302B. The slope is decreased by a pre-determined adaptability factor. This adaptability factor is the amount by which the desired acceleration is to be reduced in an attempt to retry starting motor 102 following a failure of motor 102 reaching the critical BEMF speed during start-up of motor 102. For example, the factor may be defined as ten percent (10%) of the slope every time motor 102 fails to reach the critical BEMF speed during motor start-up, and therefore, the slope term of the equation is reduced by ten percent each time motor 102 fails to reach the critical BEMF speed. Method 500 loops from block 512 back to block 506, which shows that the pre-defined commutation values for first portion 302A from the look-up table are used again to commutate motor 102. Block 508 shows that motor 102 is commutated using values that have been re-calculated from the linear equation in which the slope has been decreased for second portion 302B. Method 500 repeats the process at blocks 506, 508, 510, and 512, as necessary, until motor 102 reaches the critical BEMF speed. The final commutation periods that are used for motor 102 reaching the critical BEMF speed are calculated and used by processor 404 and pre-driver system 408 to drive commutation driver 420 and control commutation of motor 102 to model second portion 302B of commutation profile curve 302 for motor 102.

After motor 102 reaches the critical BEMF speed, method 500 moves from decision block 510 directly to block 514.

Block 514 shows that commutation is switched to the internal commutation mode in order to finish accelerating motor 102 to the target operational speed. Method 500 then finally ends at block 520.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for controlling a commutation timing of a motor that has a commutation profile characterized by an exponentially decaying curve, said method comprising:
   pre-defining a first set of commutation values for a first portion of an exponentially decaying commutation profile of the motor;
   deriving a second set of commutation values approximating a second portion of the commutation profile based on a velocity profile of the motor;
   externally controlling commutation of the motor during startup using the first and second sets of commutation values; and
   thereafter, internally controlling commutation of the motor utilizing a back-electromotive force (BEMF) detection circuit.

2. The method according to claim 1, wherein pre-defining a first set of commutation values for a first portion further comprises:
   deriving said first set of commutation values based on the velocity profile of the motor.

3. The method according to claim 2, wherein deriving the first set of commutation values further comprising:
   defining an initial value of the first set of commutation values as an inverse of a motor speed at an elapsed time from when the motor has started; and
   defining a next value of the first set of commutation values at an elapsed time when a total of the previous commutation values equals the elapsed time.

4. The method according to claim 1, wherein the velocity profile of the motor is linear.

5. The method according to claim 4, further comprising:
   defining each value of the second set of commutation values as a product of a negative slope based on acceleration characteristics of the motor and an elapsed time from a last commutation value of the first portion added to the last commutation value of the first portion of the commutation profile.

6. The method according to claim 1, further comprising:
   if the motor does not reach a critical speed by commutating the motor utilizing the second set of commutation values, re-calculating the second set of commutation values by decreasing a desired velocity at each commutation period; and controlling commutation of the motor using the re-calculated second set of commutation values.

7. A method for operating a motor that has an exponentially decaying commutation profile, said method comprising:

coupling a motor that has an exponentially decaying commutation profile to a motor control system;

pre-defining a first set of commutation values for a first portion of the commutation profile;

deriving a second set of commutation values approximating a second portion of the commutation profile based on a velocity profile of the motor;

utilizing the control system, selecting between externally commutating and internally commutating the motor; and in response to selecting external commutation, controlling start-up commutation of the motor utilizing the first and second sets of commutation values.

8. The method according to claim 7, wherein pre-defining a first set of commutation values for a first portion further comprises:

deriving the first set of commutation values based on the velocity profile of the motor.

9. The method according to claim 8, wherein deriving the first set of commutation values further comprising:

defining an initial value of the first set of commutation values as an inverse of a motor speed at an elapsed time from when the motor has started; and defining a next value of the first set of commutation values at an elapsed time when a total of the previous commutation values equals the elapsed time.

10. The method according to claim 7, wherein the velocity profile of the motor is linear.

11. The method according to claim 10, further comprising:

defining each of the second set of commutation value as a product of a negative slope based on acceleration characteristics of the motor and an elapsed time from a last commutation value of the first portion added to the last commutation value for the first portion of the commutation profile.

12. The method according to claim 7, further comprising:

if the motor does not reach a critical speed by commutating the motor utilizing the second set of commutation values, re-calculating the second set of commutation values by decreasing a desired velocity at each commutation period; and controlling commutation of the motor using the re-calculated second set of commutation values.

13. The method according to claim 7, further comprising:
coupling a spindle to the motor;
coupling at least one rotatable magnetic disk of a disk drive to the spindle;
coupling a read-write sensor to a positioning device;
positioning, by the positioning device, the read-write sensor over the at least one rotatable magnetic disk to read and write therefrom; and
driving the motor to operate the spindle and the at least one rotatable magnetic disk of the disk drive.

14. The method according to claim 7, further comprising:
in response to selecting internal commutation, controlling commutation of the motor utilizing self-commutation at a timing indicated by a back-electromotive force (BEMF) detection circuit.

15. A system for controlling a motor having an exponentially decaying commutation profile, said system comprising:

a memory that stores a first set of commutation values for a first portion of the exponentially decaying commutation profile and a linear equation describing a velocity profile of the motor for defining a second set of commutation values approximating a second portion of the exponentially decaying commutation profile; and a processor, coupled to the memory, that, based upon the first and second sets of commutation values, generates commutation signals utilized to control commutation of the motor at startup.

16. The system according to claim 15, and further comprising a motor pre-driver circuit having a back-electromotive force (BEMF) sensor that provides a feedback signal indicative of rotation of the motor, wherein the motor pre-driver circuit includes a control circuit that selects between external commutation of the motor in response to the commutation signals generated by the processor and internal commutation of the motor based upon said feedback signal.

17. The system according to claim 16, and further comprising a motor driver circuit coupled to said motor pre-driver circuit.

18. The system according to claim 17, and further comprising motor windings energized by said motor driver circuit.

19. A disk drive, comprising:
a motor having an exponentially decaying commutation profile;
a spindle coupled to the motor;
at least one rotatable magnetic disk of a disk drive coupled to the spindle;
a read-write sensor coupled to a positioning device for positioning the read-write sensor to read from and write to the at least one rotatable magnetic disk;
a motor driver circuit;
a motor pre-driver circuit coupled to the motor driver circuit;
a memory that stores a first set of commutation values for a first portion of the commutation profile and a linear equation describing a velocity profile of the motor for defining a second set of commutation values approximating a second portion of the commutation profile; and
a processor, coupled to the memory, that, based upon the first and second sets of commutation values, generates commutation signals to control commutation of the motor at startup.

20. The disk drive according to claim 19, wherein the motor pre-driver circuit further comprises:
a back-electromotive force (BEMF) sensor that provides a feedback signal indicative of rotation of the motor; and
a control circuit that selects between external commutation of the motor in response to the commutation signals generated by the processor and internal commutation of the motor based upon said feedback signal.

21. A program product for controlling a commutation timing of a motor that has an exponentially decaying commutation profile, said program product comprising:
first instructions that access and use a first set of commutation values pre-defined for a first portion of the exponentially decaying commutation profile;

second instructions that derive a second set of commutation values approximating a second portion of the exponentially decaying commutation profile from a linear equation describing a velocity profile of the motor;

third instructions that generate commutation signals for commutating the motor at startup using the first and second sets of commutation values; and computer usable media bearing said first, second and third instructions.

22. The program product according to claim 21, wherein said first set of commutation values are pre-defined based on the velocity profile of the motor.

23. The program product according to claim 22, wherein an initial value of the first set of commutation values is defined as an inverse of a motor speed at an elapsed time from when the motor has started and a next value of the first set of commutation values is defined at an elapsed time when a total of the previous commutation values equals the elapsed time.

24. The program product according to claim 21, wherein said velocity profile of the motor is linear.

25. The program product according to claim 24, wherein each of the second set of commutation values is defined as a product of a negative slope based on acceleration characteristics of the motor and an elapsed time from a last commutation value of the first portion of the commutation profile added to the last commutation value of the first portion of the commutation profile.

26. The program product according to claim 21, wherein if the motor does not reach a critical speed by commutating the motor utilizing the second set of commutation values:

said second instructions re-calculate the second set of commutation values by decreasing a desired velocity at each commutation period; and said third instructions generate commutation signals using the re-calculated second set of commutation values.

* * * * *